United States Patent [19]

Yamamoto et al.

[11] Patent Number: 4,477,094
[45] Date of Patent: Oct. 16, 1984

[54] GASKET AND METHOD FOR HIGH-TEMPERATURE AND HIGH PRESSURE APPLICATION

[75] Inventors: Tsutomu Yamamoto; Masaaki Ashizawa; Kazuo Nishimoto; Yuji Sekiguchi, all of Yokohama, Japan

[73] Assignee: Nichias Corporation, Tokyo, Japan

[21] Appl. No.: 261,051

[22] Filed: May 6, 1981

[30] Foreign Application Priority Data

May 6, 1980 [JP] Japan .................................. 55-59681
May 27, 1980 [JP] Japan .................................. 55-70370

[51] Int. Cl.$^3$ ........................ F16J 15/12; B32B 19/02
[52] U.S. Cl. ................................ 277/235 B; 277/234; 428/237; 428/281; 428/323; 428/920
[58] Field of Search .................. 277/233, 234, 235 R, 277/235 A, 235 B, DIG. 6; 428/237, 281, 288, 323, 324, 325, 363, 404, 920

[56] References Cited

U.S. PATENT DOCUMENTS

| | | | |
|---|---|---|---|
| 2,011,563 | 8/1935 | Balfe | 277/235 B X |
| 2,012,951 | 9/1935 | Brinker et al. | 277/DIG. 6 X |
| 2,029,302 | 2/1936 | Balfe | 277/235 B X |
| 3,532,349 | 10/1970 | Czernik | 277/235 B X |
| 3,595,589 | 7/1971 | Henderson | 277/235 B |
| 4,271,228 | 6/1981 | Foster et al. | 428/281 |

*Primary Examiner*—Robert S. Ward
*Attorney, Agent, or Firm*—Becker & Becker, Inc.

[57] ABSTRACT

A gasket including a sheet having a composition of 40 to 80% by weight of thin flakes of expanded vermiculite, 1 to 30% by weight of fibers, 5 to 40% by weight of fine filling grains, and appropriate amounts of a binding agent and a vulcanizing agent. The sheet also has a metal plate laminated thereto. A vortex gasket may be formed by spirally winding a metal hoop together with a filling material, which is composed primarily of expanded vermiculite.

6 Claims, 13 Drawing Figures

GASKET AND METHOD FOR HIGH-TEMPERATURE AND HIGH PRESSURE APPLICATION

The present invention relates generally to a gasket, and more particularly to a gasket such as that used in a high-temperature and pressure atmosphere, or to a vortex gasket, which is a modified version thereof. The invention is also concerned with a method for the preparation of said gaskets.

Gaskets used in high-temperature and pressure atmosphere are well known. For instance, currently available gaskets for internal combustion engines are generally broken down into the following two types. One type is referred to as the steel-best type and it comprises a thin core sheet of a metal plate provided on both sides with a multiplicity of small projections. The sheet is applied with a gasketing material on both surfaces. A metal mesh material may be used as the core material to obtain a similar gasket. The other type is called the power-best type and it has a structure in which the arrangement of the aforesaid core and gasketing material is reversed; in other words, a gasketing material is applied on both sides but the thin metallic sheet has a number of small projections on only one side.

The core metal, which has a multiplicity of small projections, is usually formed of a soft steel plate, and is about 0.15 to 0.30 mm in thickness. Each individual projection, which may take on various shapes such as rectangle, square, triangle or (inverted) trapezoid, passes through the gasketing material with its projecting point being folded down for retainment thereof.

The metallic mesh material used as the core is generally formed by plain-weaving of metal wires, such as soft or stainless steel wires, which have a diameter of about 0.2 to 0.5 mm.

Frequently used for the gasketing material is a sheet which is obtained by a known paper-making method from a slurry in which synthetic rubber or resin is bonded to asbestos fibers in water. In lieu of the sheet thus obtained, it has also been proposed to apply a combination of non-metallic organic fibers with metal fibers and boron nitride, or of asbestos fibers with flakes of graphite or mica powders, rubber, vulcanizers and fillers. It is also known to use as the gasketing material a sheet material of expanded graphite or a compound obtained by kneading together asbestos fibers, synthetic or natural rubber, synthetic resin, inorganic fillers, etc., with an organic solvent such that it has an appropriate viscosity. In the latter instance, the compound is coated onto the core material by means of friction rolls to form thereon a film having a desired thickness. Such film is dried upon removal of the solvent.

The gasketing material is then blanked into a given shape, and provided with a grommet or metal ring which is designed to prevent an escape of combustion gas prevailing in a cylinder bore portion. In this manner, a gasket is obtained which is suitable for use in, for example, the cylinder head of an internal combustion engine. Most of the gasketing materials referred to above comprise a compound consisting mainly of asbestos fibers in order to take advantage of the good properties thereof, i.e. chemical resistance, flexibility, physical resistance, etc. However, the asbestos fibers (chrysotile asbestos) have disadvantages since they slowly give off water of crystallization at a temperature of approximately 400° C. with an attendant deterioration in properties. This leads inevitably to reductions in strength and flexibility.

To provide a solution to such a deterioration problem, various proposals have been made. However, there are no studies about the development of a gasketing material in which the physical resistance and flexibility are kept intact, even at a temperature region exceeding the aforesaid temperature. A sheet of expanded graphite, which was proposed as a replacement for the asbestos gasket, has a disadvantage similar to that of the asbestos fibers. It starts to undergo oxidation at a temperature=of about 400° C. in an oxidative atmosphere, and is sublimed if oxldation is continued for an extended period of time. Difficulties are also encountered in the preparation of a gasket sheet from a slurry in which a gasketing material is dispersed in water, or a compound thereof having a suitable viscosity controlled by an organic solvent. This is because voids are left in the sheet, upon removal of the water or organic solvent, by evaporation, and drying steps which cannot be omitted. Such voids may amount to 40 to 50% by volume of the sheet. To reduce the void volume, an attempt was made to press or roll out the sheet while a core material or other material was combined therewith to form a composite product. It should be noted that the voids are present in fiber entanglements as an aggregation of numerous fine pores rather than as a few macropores. Therefore, it is very difficult to close up such fine pores by pressing the sheet in a dry state which is substantially free from solvent. In other words, such fine pores still amount to as many as 10 to 20% by volume of the gasket sheet, even upon compression, and provide passages through which a fluid leaks.

On the other hand, the cylinder head of an internal combustion engine should be sealed simultaneously, with the use of a single gasket, against transmission of three fluids, i.e., combustion gas of fuel, lubricating (engine) oil for the lubrication of mechanical parts, and cooling liquid (water) for cooling hot combustion gas. This single gasket is then required to have a so-called semi-metallic structure, in which it is covered with a grommet in order to seal the circumference of a cylinder bore portion against transmission of hot combustion gas. An opening for cooling water and lubricating oil is sealed by a composite gasketing material as blanked. A sheeting for the gasket for such a cylinder head is incorporated with fillers bonded by rubber (usually, oil-resistant synthetic rubber).

Reference will now be made to a vortex gasket, which is a modified version of the aforesaid gasket. Most of the vortex gaskets of the type used currently are constructed as follows: A metal hoop material, obtained by forming a stainless hoop into a V- or W-shape, is superimposed upon a filler material which is obtained by forming a shock-absorbing packing material of, for example, asbestos paper, into a similar shape. The obtained composite product is wound spirally, with the beginning and terminal ends being spot-welded.

The hoop material forming part of the vortex gasket is generally made of stainless steel (SUS 304, 321, 316), due to its good heat, chemical, and physical resistance. For this special purpose, SUS 316-L and 316-LEC, which are also alloys of stainless steel, or other substances such as titanium, Monel and Inconel may be employed.

The most usual filler material is asbestos paper. PTEF, in particular, is employed in a case in which chemical resistance is of importance. Due to its heat and chemical resistance, natural graphite is also used in the form of an expanded graphite sheet. For this special purpose, use may be made of an asbestos joint sheet, which is superior in sealing characteristics relative to the asbestos paper.

With the vortex gasket of the aforesaid structure, the edges of the hoop material formed into a V- or W-shape come in tight contact with the surfaces of the parts joined therethrough, and seal them against transmission of fluid in a metal-to-metal contact manner. At the same time, the filler material rolled in between the hoop material functions as a cushion, in combination with the denseness thereof and the width of the contact surfaces of the parts. In this manner, the filler material aids the impact resistance of the hoop, and seals the parts against transmission of a portion of the fluid which still leaks. Such a sealing mechanism is repeatedly developed to achieve sealing against transmission of the fluid.

The vortex gasket, working on the sealing principle (mechanism) as mentioned above, requires a relatively large clamping force in view of the need for making a metal-to-metal contact more tight. A main use of the vortex gasket is in sealing a high-pressure and -temperature region against transmission of fluid.

In general, the vortex gasket is fundamentally formed into a ring shaped cross-section, and may be formed into a special shape in cross-section, such as oval, track, diamond or rectangular shape, depending upon the purpose. When simultaneously sealing a certain apparatus, such as a heat exchanger, against transmission of a plurality of fluids with the use of a single vortex gasket, the latter may be of a so-called branched type, in which the basic version of vertex gasket is modified in such a way that its inside is divided into two or three parts corresponding to the flanges to which it is to be joined.

The main use of most of the vortex gaskets is that of sealing a high-temperature and -pressure region against transmission of fluid, and they are provided with inner and outer reinforcing rings capable of resisting the fluid pressure. At the same time, these rings are designed to serve as a compression gauge having an outer diameter and a thickness sufficient to maintain centering and keep the amount of clamping constant when the gasket is joined to associated flanges. As a result, the vortex gasket is clamped in the optimum state.

The vortex gasket, as characterized above, is used mainly in chemical plants and apparatus as a seal resistant to high-temperature and-pressure; however, the range of its use is now increasing to include its use as a low-pressure seal.

As mentioned above, asbestos paper is most generally used as the filler material for the vortex gasket. Asbestos fibers (chrysotile asbestos, forming a major part of asbestos paper, begin to lose the water of crystallization contained in their tissue at temperatures of 400° to 500° C. At about 800° C., substantially all the water of recrystallization is eliminated so that the fibers undergo degradation. Due to its lack of resiliency in a high-temperature region, the asbestos paper suffers increasing torque losses, which results in marked deterioration in the sealing characteristics of the vortex gasket.

Since the asbestos paper is a fibrous material, a filler material which is composed mainly thereof is deficient in denseness, and encounters extreme difficulty in sealing various parts against transmission of fluids, especially gases.

In addition, the asbestos fibers are dug out of the ground with chlorine ions (Cl$^-$) and magnetite being contained therein. A technique for complete separation of such chlorine ions and magnetite from the asbestos fibers has not been developed up to now. Accordingly, asbestos paper using asbestos fibers is still contaminated with these substances. Surprisingly, the asbestos fibers may have a chlorine ion content exceeding 1,000 ppm depending upon the place of production.

The vortex gasket is mainly used for sealing a high-pressure and -temperature region against transmission of fluids, as mentioned above, and most of the equipment and piping applied to such a region are formed of stainless steel. When the vortex gasket comes in contact with associated flanges of stainless steel, there is always a possibility that the presence of large quantities of chlorine ions and magnetite contained therein will pose problems in connection with corrosion, for example, electrolytic or pin-hole corrosion, of the stainless steel.

However, asbestos fibers which are white or light-green inorganic fibers expressed by the following empirical formula: $Mg_3.Si_2O_5(OH)_4$, have advantages. They have a rather small diameter, in the order of 0.000033 mm, are rich in flexibility, possess strength on the order of 190 to 330 kgf/mm$^2$, and have a greater tensile strength than that of steel, and are stable as well as resistant relative to many chemicals. This is why a gasketing alternative to the asbestos fibers has not been substantially introduced up to now.

Despite the fact that asbestos fibers are deficient in high-temperature resistance substantially over its entire range of applicability, they are now reluctantly used as a gasketing material. However, the asbestos fibers encounter limitations, or even difficulties, in use due to their adverse influence upon the human body.

As mentioned above, the vortex gasket was originally designed for use in the sealing of a high-temperature and -pressure region, and is now available in the sealing of a low-pressure fluid region as a result of its stability. Parts of equipment or piping applied to such a low-pressure region are designed to have a strength corresponding to the pressure or pressure rating of a working fluid. However, it is impossible to obtain a clamping force sufficient to permit a complete metal-to-metal contact of the hoop with the flanges to which they are to be joined, with the result that the vortex gasket does not operate on the intended sealing mechanism. Under such conditions, it is impossible to attain complete sealing unless the filler material fills up an unsatisfactory metal-to-metal contact. Consequently, it has now been found that the properties of the filler material play an important role.

Recently, a sheet of expanded graphite was proposed as a unique filler material which is equivalent to asbestos. Although this sheet has sufficient denseness to fulfill the abovementioned requirements, it is very expensive. This sheet also has a disadvantage. It undergoes oxidative sublimation upon being heated to more than 400° C. in an oxidative atmosphere, and so is not put to practical use.

Although a sheet of fluorine resin has been proposed as well, it meets only the chemical resistance requirement since it is a thermoplastic, polymeric material which is essentially of no avail in the area of high-temperature resistance.

Thus, there is a strong demand for the development of a gasketing material which is inexpensive, but yet is equivalent in various properties to asbestos fibers.

It is an object of the present invention to eliminate the drawbacks of the prior art gaskets. It is therefore a main object of the present invention to provide a gasket or vortex gasket which can retain its strength and resiliency, even at a temperature exceeding 400° C.

These and other objects and advantages of the present invention will appear more clearly from the following specification with the accompanying drawings, in which.

Figure 1:
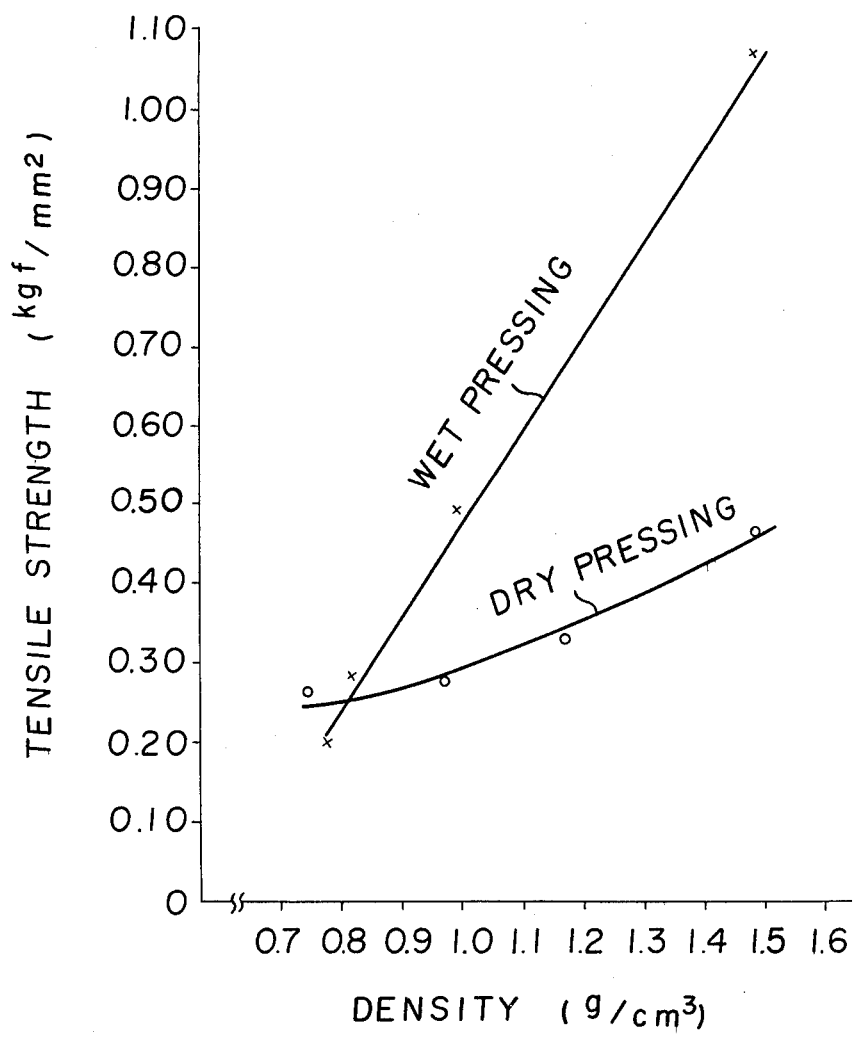
FIG. 1 is a graph showing the physical properties of the inventive and prior art gaskets for the purpose of comparison.

The gasket according to the present invention, is characterized primarily in that it comprises a sheet obtained from a composition consisting of 40 to 80% by weight of thin flakes of expanded vermiculite, 1 to 30% by weight of fibers, 5 to 40% by weight of filling fine grains, and appropriate amounts of a binding agent and a vulcanizing agent, and a metal plate laminated thereon. The gasket is a composite product which has therein a minimum of voids and hence a greatly improved sealing effect. The method according to the present invention, is characterized primarily in that a vortex gasket is formed by spirally winding a metal hoop together with a filling material, and the filling material is composed mainly of expanded vermiculite. This vortex gasket can exhibit a stable sealing effect even in a low clamping pressure region.

First of all, vermiculite used as a main material in the present invention will be explained.

Substances generally known as flake structures include mica and graphite, in addition to vermiculite. A known method carried out to expand these substances in a flake-like manner comprises, for instance, impregnating chemicas in between the flakes thereof and heating the thus impregnated masses to a temperature at which decomposition of the chemicals takes place, thereby obtaining an expansion force sufficient to cause separation of the flakes from each other. An industrially available method for the expansion of vermiculite, on the other hand, involves rapidly exposing it to a high-temperature atmosphere, e.g., placing it in a rotary kiln maintained at near 100° C. The interlaminar water of crystallization in the flake structure then evaporates rapidly as a result of the formation of an expansion pressure which permits separation of the flakes from each other. The former method requires troublesome chemical-treating and drying steps, and is more expensive than the latter method. Therefore, the latter method is generally used for the production of industrial materials, such as aggregates for heat insulation, spraying materials, materials for modifying paints, etc.

This is why the expanded vermiculite is selected from the flake structures in the present invention.

Vermiculite has a structure resembling black mica belonging to a three-layer mineral, and is expressed in the pure form by the following structural formula according to I. Barshad (1948):

$[Mg_3, Al_2, Fe_2]O_2 \cdot \Delta(Si, Al, Fe)O_2 \cdot H_2O[XH_2O \cdot YMgO \cdot ZCa]$

Octahydron Layer　Tetrahedron　Water of　Interlamilar
　　　　　　　　　Layer　crystallization　Arrangement Upon being heated to 700° C. or higher, the vermiculite starts for the first time to lose its water of crystallization (water contained in the crystal). Thus, the vermiculite has an advantage over the asbestos fibers in heat resistance, since the latter gives off the water of crystallization at a lower temperature of about 400° C.

The vermiculite, as expanded in the foregoing manner, is larger in volume than the original vermiculite by a factor of 5 to 20. It provides a very weak and fragile sheet, even if the particles of such expanded vermiculite are physically bonded to each other. This is because the surface of the bonded particles have an extremely low strength. However, with the flakes separated from the expanded vermiculite by applying a shearing force on the vermiculite dispersed in water with the use of a high-speed mixer or by applying a shearing force on the vermiculite in a dry state with the use of a disintegrator such as miracle mill, it has now been found by experimentation that a flexible but firm sheet is obtained by bonding the thus separated flakes with each other at their activated surfaces.

To afford strong activity to the surfaces of the separated flakes, it has been ascertained that they should preferably be 10 to 60 meshes in diameter and no more than 100 microns in thickness.

With a composition composed mainly of thin flakes of expanded vermiculite and further including fibers, finely divided particles, binders and vulcanizers, it is possible to obtain a gasketing sheet in which are filled, in the densest state, the thin flakes of vermiculite, the fibers and the finely divided particles which are different in shape from one another. Since the prior art gasketing sheet, which was composed mainly of fibers, cannot be put in the densest state, it is impossible to decrease the number of finally remaining voids or pores. This leads to deterioration in the sealing characteristics of the gasket.

In the following table, the denseness of the composition composed mainly of thin flakes of vermiculite and further including fibers and finely divided particles is shown in terms of bulk density according to JIS cylinder method. The table also sets forth that of the prior art fiber-filled sheet for the purpose of comparison.

TABLE

|  | Fibers | Particles | Flakes | Bulk Density to JIS cylinder method |
|---|---|---|---|---|
| Prior Art Composition | 70% | 30% | — | 1.31 g/cm³ |
| Prior Art Composition | 60% | 20% | 20% | 1.35 g/cm³ |
| Prior Art | 30% | 30% | 40% | 1.43 g/cm³ |

TABLE-continued

|  | Fibers | Particles | Flakes | Bulk Density to JIS cylinder method |
|---|---|---|---|---|
| Composition Inventive Composition | 10% | 30% | 60% | 1.54 g/cm³ |
| Inventive Composition | 1% | 19% | 80% | 1.58 g/cm³ |
| Inventive Composition | 0% | 10% | 90% | 1.50 g/cm³ |

As a result of the abovementioned experiments, it has been found that the composition having the greatest effect on the denseness of the inventive product contains 40 to 80% by weight of thin flakes of vermiculite, 5 to 40%, preferably 19 to 30%, by weight of finely divided particles, and 1 to 30% by weight of fibers. It will be understood that those skilled in the art may easily determine the range of each component added depending upon the purpose.

The fibers used in the present invention include any suitable fibers except asbestos fibers, such as non-metallic inorganic fibers and metal fibers. Although it has heretofore been considered that difficulties are encountered in preparing a sheet with the use of only non-metallic fibers, it is possible in the present invention not only to use such non-metallic fibers as carbon fibers, phenol fibers or ceramic fibers, but also to use metal fibers such as stainless steel fibers or brass fibers.

The gasket for an internal combustion engine, which uses the aforesaid fibers, has the advantage that heat generated by explosion and combustion of fuel escapes through a metal grommet applied over a cylinder bore portion into a cooling water discharge port along a reinforcing metal plate. A disadvantage of the conventional gasket, comprising a main gasketing material incorporated with asbestos fibers, is that the heat of combustion is accumulated causing increasing deterioration in the physical properties. This is because the asbestos fibers have a low heat conductivity and have difficulty conducting heat. However, both the non-metallic fibers such as glass fibers and the metal fibers such as stainless steel fibers used in the present invention have a heat conductivity greater than that of the asbestos fibers, and permit a positive escape of heat even from the sheet portion. In particular, use of the metal fibers such as stainless steel fibers have a synergistic effect on the heat resistance of vermiculite, resulting in a great increase in thermal resistance. For the purpose of comparison, the heat conductivity, tensile strength and changes in tensile strength upon heating of the inventive and prior art products are set forth in the following table.

TABLE

|  | Invention | Prior Art |  |
|---|---|---|---|
| Heat conductivity | Kcal/mh °C. 0.181 | Kcal/mh °C. 0.210 |  |
| Tensile Strength | 63 kg f/cm² | 107 kg f/cm² |  |
| Changes in tensile strength upon heating |  |  | Heating Temperature |
|  | 0% | 0% | Normal Temperature |
|  | +80% | +20% | 100° C. |
|  | +70% | +17% | 200° C. |
|  | −45% | −30% | 300° C. |
|  | −40% | −23% | 400° C. |
|  | −28% | −25% | 500° C. |

TABLE-continued

| Invention | Prior Art |  |
|---|---|---|
| −26% | −21% | 600° C. |

The gaskets according to the present invention can be made in various methods.

In particular, the starting composition can be formed into a sheet by either one of the coating and extrusion processes of the papermaking type. Thus, a high-performance sheeting can be manufactured inexpensively and easily with no need for special equipment.

The sheeting is laminated upon a reinforcing metal plate to form a composite sheet. When the composite sheet is then pressed or rolled out in a wet (semi-dry) state, the thin flakes of vermiculite are orientated in the planar direction of the sheet, so that the flakes, the fibers and the fine filling particles are put in the densest state. At the same time, the activated lamination planes of the discrete thin flakes are permitted to re-contact or come into engagement again with each other, thereby affording flexibility to the sheet. Such flexibility is not attained in the conventional sheet. The results of flexibility testing carried out according to JIS R 3453 are given in the following table.

TABLE

|  | Prior Art Sheeting (A) | Prior Art Sheeting (B) | Inventive Sheeting (C) | Inventive Sheeting (D) |
|---|---|---|---|---|
| Flexibility (F) | 27 | 15 | 1 | 0.3 |

In the table, a value F for flexibility is understood to mean a ratio of the diameter of a round metal rod to the thickness of a sample, wherein no crack or fissure is observed in the sample wound 180° around the rod. A lower value indicates a higher flexibility.

The graph of FIG. 1 shows a relationship between the density and tensile strength of a sheet which is especially rolled out or pressed in a wet state in order to orientate thin flakes in the planar direction thereof. For the purpose of comparison, FIG. 2 also relates to a case in which a similar sheet is pressed in a dry state.

When the composition according to the present invention is pressed, the thin flakes are orientated in the planar direction of the sheet with an attendant increase in density, so that the activated lamination planes of the flakes are brought into re-contact with each other with a binding force, thus resulting in an increase in tensile strength. It can be seen from FIG. 1, however, that the sheet pressed in a wet (semi-dry) state has a far greater tensile strength, at the same density, than that of the sheet pressed in a dry state. This is due to the fact that the activated lamination planes of thin flakes are placed in a wet state that assures a more actively binding effect. The resulting tensile strength is thus said to be a major breakthrough that is, for the first time, realized through a synergistic action with the closest packing effect of the composition as previously discussed. It is here noted that if a sheet remaining wetted is superimposed on a reinforcing metal plate, and the thus obtained composite sheet is rolled out or pressed as such, an amount of water is squeezed out of the sheet by a pressing force with the consequence that the sheet flows. This may render an increase in density difficult. However, the density can easily be increased by pressing the composite sheet while absorbing the squeezed out water in filter paper, woven fabric or a blanket interposed between it and the roll or press.

The gasket of the present invention can be applied to the cylinder head of an internal combustion engine with advantages which will now be explained.

As previously described, the cylinder head of an internal combustion engine should be simultaneously sealed against transmission of three fluids, i.e., combustion gas of fuel, lubricating (engine) oil for the lubrication of mechanical parts, and cooling water for removing the heat of combustion gas with the use of a single gasket. Accordingly, the gasket is designed for each of the requirements which vary as a function of the properties of these fluids. For instance, a cylinder bore is required to have a semi-metallic structure, in which the gasket is covered with a metal grommet in order to seal it against transmission of high-pressure and -temperature combustion gas, and an opening for cooling water and lubricating oil is provided with a composite gasketing material as blanked. This is a basic structure for generally available cylinder heads. However, a cast aluminum alloy has recently been introduced as a cylinder head material for a reduction in the overall weight of the engine, an increase in cooling efficiency, and other considerations. Such a material poses problems in connection with the structural strength of the aluminum alloy; limitations are placed upon the amount of clamping force to be applied on the gasket for the cylinder head; and the cylinder head suffers deformation with a local deficiency of the clamping pressure.

These phenomena seem to happen in different ways if viewed from another angle. Consequently, investigations are carried out on clamping pressure applied to each individual internal combustion engine. When a deficiency of clamping pressure is then detected, a sealing material compatible with the surface of a flange is locally applied, such as by dipping, coating or padding.

According to the gasket of the present invention, however, the sheeting material is composed mainly of thin flakes and a minor amount of fiber materials and finely divided grains in the closest packing state, and has the thin flakes orientated in the planar direction thereof. This assures that the gasket has good sealing characteristics which are attributable to its high flexibility and which are not all attained in the prior art gasket composed mainly of a fibrous material, and it undergoes little or no decrease in strength even upon exposure to an atmosphere in excess of 400° C. with sustained elasticity or resiliency. Since the gasket of the present invention is capable of preventing deterioration in sealing and torque characteristics due to thermal degradation, it can surely seal the cylinder head of an internal combustion engine against transmission of the aforesaid three fluids.

In addition, the use of non-metallic fibers (glass, carbon or similar fibers. and metal fibers (stainless steel, brass or similar fibers) as an alternative to asbestos fibers is effective not only in the elimination of the adverse influence, upon the human body, of asbestos dust generated during handling, but also in the improvement of the cooling efficiency of the engine and of the durability of the gasket since the metal fibers serve as a mediator for the transmission of heat.

The gasket of the present invention, which is typically applicable to internal combustion engines, has great economical advantages over the prior art in that it can be fabricated on existing equipment, with no need of specially designed apparatus, by using expanded vermiculite, which is inexpensive, as a main starting material.

The present invention will now be explained with reference to a vortex gasket.

According to the present invention, a vortex gasket is also provided, in which there is packed or filled a sheet formed from a mixture of the aforesaid discrete expanded vermiculite with unexpanded vermiculite. When this gasket is mounted on an associated flange and put in a high-temperature atmosphere, the unexpanded vermiculite is expanded under the action of the heat causing further increase in the packing or filling density between the hoop. At the same time, the resulting expanding force acts as a reaction force that gives rise to an augmentation of the impact resilience of the gasket, and leads to enhanced sealing characteristics thereof.

It will, of course, be understood that for more satisfactory impact resiliency, it is advantageous to impregnate, in advance, the unexpanded vermiculite with an expanding agent which decomposes at a temperature below the service temperature of the vortex gasket. For the expanding agent, preference is given to, for example, an aqueous solution containing nitrate ions and ammonia ions.

Further increases in strength and flexibility may be attained by incorporating non-metallic fibers, metal fibers, binders, fillers, etc., in addition to the expanded vermiculite in the sheet material.

The vortex gasket according to the present invention can be manufactured in the same manner as that applied in the production of the prior art vortex gasket in which asbestos is used for a sheet material.

A general method for the production of vortex gaskets will now be briefly explained.

Figure 4:
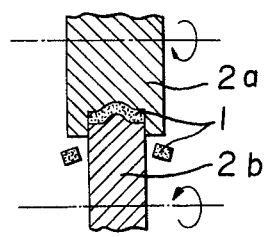
FIG. 4 is a sectional view of filler embossing rolls for the illustration of the method for the production of a conventional vortex gasket.
Figure 5:
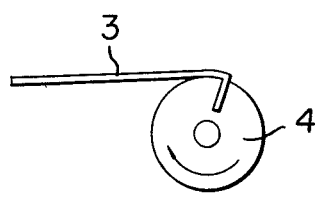
FIG. 5 is a side view of a hoop and a winding mandrel.
Figure 6:
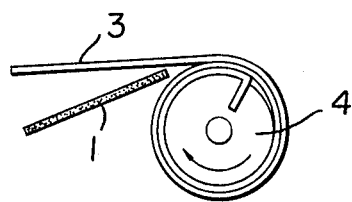
FIG. 6 is a side view showing the winding mandrel for winding the hoop superimposed on the filler.

As shown in FIG. 4, a sheet 1 of asbestos paper having a given thickness is cut off to prepare a filler material having a width of about 5 mm, while it is embossed by means of a set of roll shear cutters 2a and 2b. A hoop material is also embossed by similar means. As shown in FIG. 5, one end of the embossed hoop 3 is first fitted into a groove in a winding mandrel 4 of a winding machine. Two or three turns of the hoop are provided on the mandrel, followed by spotwelding. Then, as shown in FIG. 6, the embossed filler materials 1 of asbestos paper are inserted into the hoop 3, and are wound together with the hoop to provide a given gasket width. After the filler material 1 is cut off, two or three turns of the hoop material 3 alone are provided, followed by spot-welding in the same manner as mentioned above. The thus spirally wound gasket is removed from the mandrel, and unnecessary portions of the hoop material are cut off, leaving openings for the insertion of a slit, etc.

Figure 7:
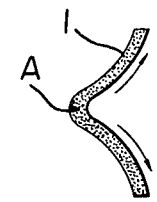
FIG. 7 is a side view of the embossed filler.
Figure 8:
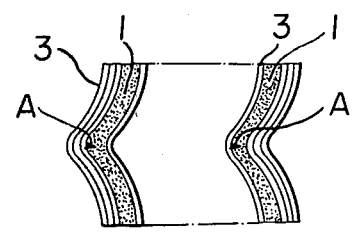
FIG. 8 is an end view of the construction of a vortex gasket.

FIG. 7 is a partial section showing the filler material forming part of the vortex gasket. Usually, elongation of the filler (of asbestos paper) takes place when it is being embossed and cut off with the roll cutters, so that a crack or crevice is formed in a portion indicated at A. Such a crack is left as a deficient portion, in which packing is insufficient, in the spirally wound gasket (see FIG. 8). This is particularly pronounced in the filler material which is composed mainly of vermiculite.

Such a deficient portion provides a fluid channel, extending spirally from the inside to the outside of the gasket, which is responsible for deterioration in the sealing characteristics.

However, if the filler material is provided with a material capable of overcoming a tensile force which may be exerted by the roll cutters in the step of embossing the filler material, the occurrence of such a deficient portion as exemplified by a crack or crevice can then be avoided during the embossment of the filler material.

Figure 9:
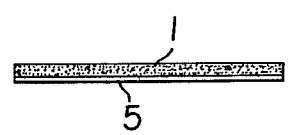
FIG. 9 is a partial side view of a laminate of a filler and a metal web.

As shown in FIG. 9, a soft metal web 5 can be laminated upon the filler material 1 to form a composite sheeting, which is, in turn, embossed into a V- or W-shape from the outside of the web, by means of the roll cutters. The metal web may be formed of aluminum, copper, babbit metal, nickel, silver, gold, etc, and preferably has a width of 0.2 mm or less.

Figure 10:
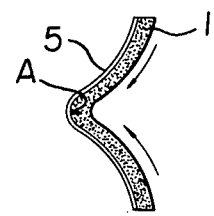
FIG. 10 is a side view of the embossed laminate.

In general, the soft metal web formed of aluminum, babbit metal, etc., has a tensile strength greater than that of the filler material, and exhibits a lower elongation in the width direction of the filler material when a tensile force is applied thereto during embossing. An overall elongation of the composite sheeting is smaller than that of the sheeting which consists only of a filler material. Such a reduction in the overall elongation causes the filler material to be withdrawn just before the roll cutters, as indicated by arrows in FIG. 10.

This assures that a crack or crevice is not formed in the portion A of the filler material having a soft metal web laminated herein, even under the action of a tensile strength. In addition, since the embossing is effected mainly on the soft metal web, the resulting composite sheeting has a rather small curvature and its compactness and denseness is excellent.

Figure 11:
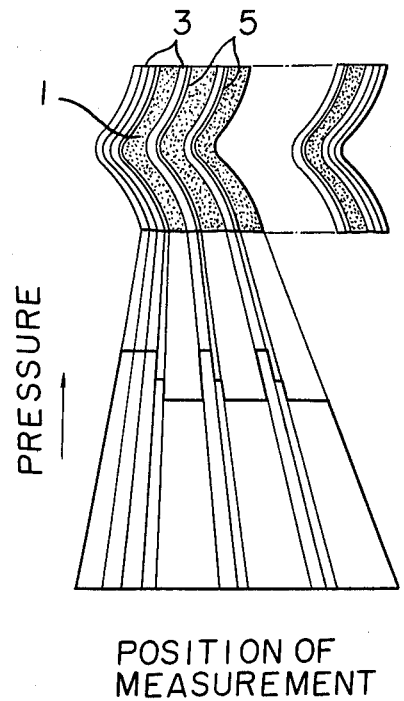
FIG. 11 is a view illustrative of the distribution of clamping pressures of the inventive vortex gasket.
Figure 12:
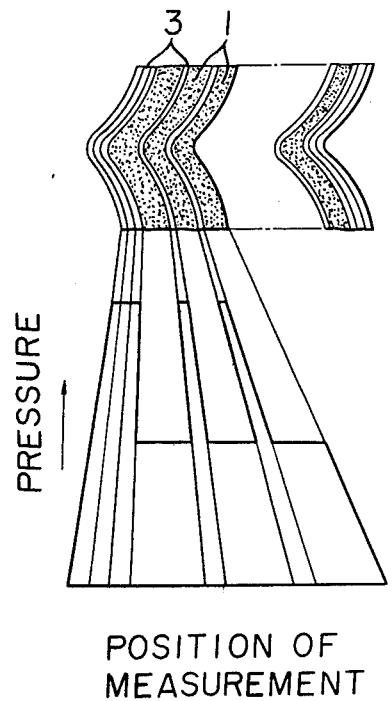
FIG. 12 is a view illustrative of the distribution of clamping pressures of the prior art vortex gasket.

With respect to the clamping pressure, which is one of the important factors for the estimation of sealing characteristics according to the pressure-sensitive sheet method, measurements were carried out on the inventive vortex gasket in which the filler material of vermiculite was obtained by the abovementioned embossing step and on the prior art vortex gasket. From the results shown in the following table and FIGS. 11 and 12, it has been found that, in the inventive gasket, the filler material has an improved denseness with a good pressure distribution in which there is only a little difference between the pressures applied in the hoop 3 and the filler 1.

TABLE

|  | Prior Art | Invention |
| --- | --- | --- |
| Crack or Crevice in Portion A | Observed | Same |
| Packing Density of Filler | 1.47 g/cm$^3$ | 1.76 g/cm$^3$ |

A vortex gasket, in which a hoop material is tightly joined to a filler material having a good flexibility, is obtained by applying a hydrous composition consisting mainly of expanded vermiculite on the hoop material, followed by drying, which permits direct embossing of the thus obtained laminate of the filler and the hoop.

As mentioned above, vermiculite is a hydrous silicate mineral as will be understood from I. Barshad's structural formula (1948), and has a large quantity of water of crystallization in its flaky interlaminar structure. The interlaminar wate of crystallization is dispersed and evaporated rapidly upon being heated rapidly to elevated temperatures and generates a force sufficient to permit separation of the flakes from each other. As a result, successively expanded vermiculite in the form of a green caterpillar is obtained.

It is also known that similar expanded vermiculite is obtained by allowing permeation of a peroxide, such as hydrogen peroxide, and the aforesaid chemicals into the flaky layers, and heating them to a temperature at which rapid scattering of the chemicals is promoted (this temperature is usually lower than that at which scattering of the interlaminar water occurs.).

The thus expanded vermiculite is dispersed in water and sheared at high speeds to obtain thin flakes. The flakes are then adjusted in such a manner that they have a diameter of 246 microns (60 meshes) to 165 microns (10 meshes), and are formed into a sheet by means of a paper-making method. Such sheet possesses a degree of flexibility that is unattainable in the prior art. This is due to the following fact.

The thin flakes obtained by shearing of expanded vermiculite have lamination planes which were initially bonded to each other. Still activated in the form of thin flakes, these planes are recombined with each other in the sheet-making step so that a sheet excelling in flexibility is obtained.

As mentioned above, however, the method comprising the steps of applying a hydrous composition of flaky vermiculite used as a filler on a hoop material and pressing the filler during embossing has an advantage over the sheet-making method in that the number of the activated planes of flakes orientated in parallel increases. This results in the formation of a filer which is excellent in both bonding force and flexibility. In addition, since pressing is effected during the course of embossing, any pressurizing treatment of vermiculite can be omitted.

As previously mentioned in connection with the preparation of expanded vermiculite, it is preferable to use chemically treated vermiculite since flakes retaining an amount of water of crystallization can be obtained therefrom.

The surface activity of the thin flakes acts not only on the flakes per se, but also on the surface of a metal. Although varying in magnitude depending upon the surface smoothness of metals, the bonding force resulting from this activity can act on all kinds of metals. However, with respect to metals, fabrics or blankets which have irregularities on the surface, such a force is very weak.

The present invention will now be explained with reference to the following non-restrictive examples. Examples 3 and 4 relate to the vortex gasket.

EXAMPLE 1

A grade No. 3 vermiculite ore was rapidly fired and expanded at 900° C. in a rotary kiln to prepare expanded vermiculite. This vermiculite was sheared at high speed in a disintegrator to obtain thin flakes having a diameter of 50 meshes and a thickness of 35 microns. 41 kg of the thin flakes of vermiculite were dispersed in 1000 liters of water, together with 4 kg of glass fibers having a diameter of 12 microns and a length of 100 mm and 22 kg of clay having a particle size of no more than 7 microns. To the resultant dispersion (slurry) was added, under agitation, 4 kg of synthetic rubber latex and 0.3 kg of a vulcanizing agent. It was then processed in a paper machine and dried, thereby obtaining a vermiculite sheeting having a thickness of 1.5 mm and a bulk density of 0.78 g/cm$^3$. This sheeting was laminated, while subjected to force, on both surfaces of a thin soft steel plate having a thickness of 0.2 mm and being provided on both sides with triangular projections. The thus obtained composite sheet was embossed and rolled out by a pressing roll to orientate the thin flakes in the planar direction of the steel plate. In this manner, a gasketing material comprising a sheet having a density of 1.5 g/cm$^3$ and an overall thickness of 1.8 mm was obtained. This material was blanked into a customarily available shape, and was provided on its cylinder bore portion with a grommet of stainless steel (SUS 304) having a thickness of 0.22 mm in order to obtain a gasket for the cylinder head of an internal combustion engine.

Figure 2:
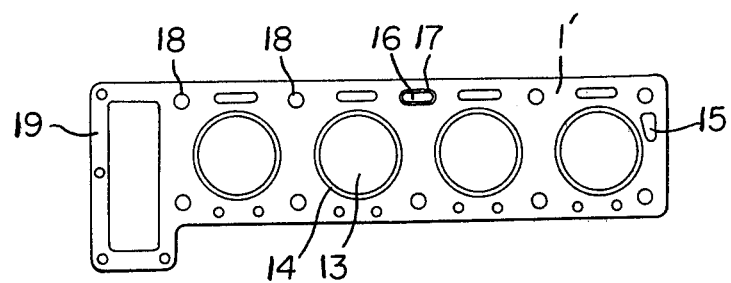
FIG. 2 is a plan view showing one embodiment of the gasket according to the present invention.
Figure 3:
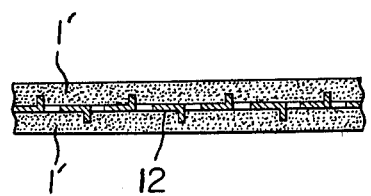
FIG. 3 is a partially enlarged section of the gasket of FIG. 2.

As shown in FIGS. 2 and 3, the obtained gasket comprises a sheeting 1' of vermiculite, a thin metal plate 12 for reinforcement, a cylinder bore portion 13 which is provided with a grommet 14, an opening 15 for cooling water, an opening 16 for lubricating oil which is provided with a grommet 17 and a bolt bore 18. This gasket was assembled to the cylinder head of an automotive internal combustion engine by clamp bolts with a torque of 800 kgf-cm. It was then subjected to a cyclic durability test on a bench under the condition that the engine was forcibly cooled with cooling water at 6000 rpm. The results were satisfactory, as is shown in the following table.

| Results of Cyclic Durability Test | |
| --- | --- |
| Sealing Pressure for Cooling Water | 5 kgf/cm$^2$G |
| Sealing Pressure for Lubricating Oil | 7 kgf/cm$^2$G |
| Sealing Pressure for Combustion Gas | 45 kgf/cm$^2$G |
| Torque Down | 7% |
| Compression Rate | 18% |
| Trace of Unusual flow | none |

EXAMPLE 2

A grade No. 2 vermiculite ore was rapidly fired and expanded at 900° C. in a rotary kiln to prepare expanded vermiculite. 55 kg of the expanded vermiculite, together with 150 liters of water, were charged in a Henschel mixer, and were sheared at high speed in water in order to prepare an aqueous slurry of thin flakes having a thickness of 23 microns. This slurry was passed into a machine chest to which 1350 liters of water were added. To this slurry were also added 2 kg of pulp, 8 kg of stainless steel having a length of 12 microns, and 37 kg of clay having a diameter of no more than 7 microns in order to prepare a uniform dispersion. To the obtained dispersion or slurry there was added, under agitation, 5 kg of synthetic rubber latex and 0.4 kg of vulcanizing agent. This was slowly added while continually agitating with a sulfuric acid band having a concentration of 5% until the latex was completely fixed. The resulting slurry was processed in a paper machine to prepare a sheeting being 2 mm in thickness. This sheeting was superimposed, while subjected to force, upon both surfaces of a soft steel plate having a thickness of 0.25 mm and being provided on both sides with rectangular projections such as those of a grater. The obtained composite sheet was pressed, on a hydraulic press, into a state wherein it was covered on both sides with a blanket, thereby squeezing the water therefrom. This sheet was dried in an oven maintained at 110° C. to obtain the gasketing material. This material was blanked into a customarily available size, and was provided with a cylinder bore portion, an opening portion for lubricating oil, and a portion corresponding to a chain case with a grommet of soft steel having an SPCC thickness of 0.2 mm and a width of 3 mm, a grommet of copper having a Cup thickness of 0.15 mm and a width of 2 mm, and a film 19 treated locally by means of a synthetic resin sealing agent and having a thickness of 0.05 mm (see FIG. 2). In this manner, a gasket for the cylinder head for an internal combustion engine was fabricated.

The obtained gasket was assembled relative to the cylinder of an automotive internal combustion engine by means of clamp bolts with a torque of 750 kgf-cm, and was subjected to 50 cycles of simulation testing; one cycle involving 30 min. heating using vapor directed from a boiler to a cooling water passage, ard 30 min. cooling using tap water. The results were satisfactory, as is shown in the following table.

TABLE

| | Invention | Prior Art |
| --- | --- | --- |
| Weight Loss upon Intense Heating | 13.4% | 18.4% |
| Stress Relaxation | 17% | 26% |
| Water Leak Testing (measured after 50 cycles of simulation testing) | | |
| 1.0 kfg/cm$^2$G | No leak | No leak |
| 2.0 | " | " |
| 3.0 | " | " |
| 3.5 | " | Leak observed |
| 4.0 | " | " |
| 4.5 | " | " |
| 5.0 | " | " |

As stated above, the gasket of the present invention has good sealing characteristics which are sufficient to seal the cylinder head of an internal combustion engine against transmission of three fluids, i.e., combustion gas, lubricating oil, and cooling water. It can also retain its strength and resiliency, even at a temperature in excess of 400° C., and can be used for an extended period of time without difficulty.

EXAMPLE 3

Figure 13:
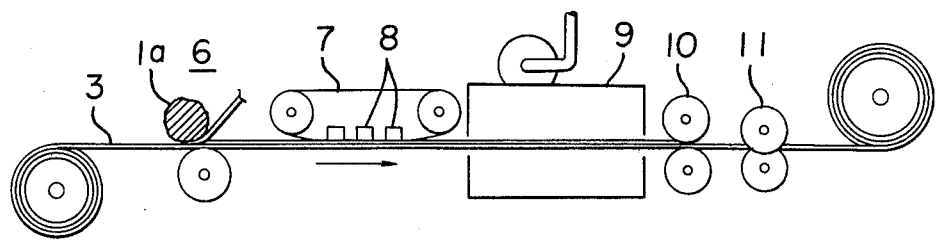
FIG. 13 is a side view of an apparatus for producing the inventive vortex gasket.

A grade No. 3 vermiculite ore was treated with 10% hydrogen peroxide. 100 parts of the thus expanded vermiculite were sheared at high speed in a mixer, together with double amounts of water, for 10 minutes in order to prepare thin flakes. To the flakes there were added, under ample agitation, 10 parts of unexpanded vermiculite, 3 parts of glass fiber, and 17 parts of clay to produce a slurry to which were added, while mixing at a low speed, 5 parts of synthetic rubber latex and 0.5 parts of a dispersion of a vulcanizing agent. The thus obtained dense slurry was applied up to a given thickness on a metal hoop 3 by means of a coater 6 as shown in FIG. 13. Making use of the fact that the thin flakes show good adhesion to the hoop but poor adhesion to the blanket, excessive water was squeezed out of the composite sheeting by a blanket-made caterpillar 7 and a suction box 8. The sheeting was then dried in a drying chamber 9, was pressurized by pressing rolls 10 in such a manner as to orientate the thin flakes in the planar direction, and was embossed and slitted by means of roll cutter 11. The sheeting was thereafter spirally wound to prepare a gasketing material. To attain more satisfactory orientation of the thin flakes, friction rolls were employed as the pressing rolls. The upper roll (for the coating of slurry) was rotated in synchronized relation to the running speed of the product to be pressed and at a speed faster than that of the upper roll, so that planar forces acted simultaneously on the product to be processed.

It is noted that vortex gaskets can be prepared directly without using the winding step if the production speed thereof is synchronized to a machine (not shown) for winding the gasketing material.

EXAMPLE 4

Impacts were applied to 7.5 kg of a grade No. 3 vermiculite ore and 31 kg of expanded vermiculite that had been rapidly fired and expanded in a rotary kiln at 900° C. until most of them were converted into thin flakes having a diameter of 20 to 40 meshes and a thickness of 15 to 30 microns, followed by dry separation. The thus separated flakes were charged into a machine chest together with 3000 liters of water. To this was also added 5 kg of linen pulp, which had been immersed in water for 24 hours, and 7 kg of bentonite having a particle size of no more than 7 microns. The contents of the chest were dispersed by stirring for 15 minutes. Stirring was continued with the addition of 8.8 kg of NBR latex (having a solid content of 40% by weight) and 0.7 kg of a vulcanizing liquid dispersion (having a solid content of 10% by weight). Thereafter, 0.8 kg of sulfuric acid band (having a solid content of 10% by weight) and 5 kg of Ceparane (having a solid content of 0.2% by weight) were slowly added for fixation of the latex.

The resulting slurry was formed into a sheet by a paper machine and then dried, thereby forming a vermiculite sheet having a thickness of 0.8 mm and a bulk density of 0.81 g/cm$^3$.

This sheet, with the aid of the embossing roll (FIG. 4) was processed into a V-shaped tape. This tape was superimposed upon a previously V-shaped steel hoop of SUS 304 having a thickness of 0.2 mm and a width of 4.5 mm, as shown in FIG. 5, and was wound six times in the manner as shown in FIG. 6. After cutting out the vermiculite tape, three turns of the hoop line were provided, followed by spot-welding. The obtained vortex gasket had a 50$\phi$ inner diameter, a 61$\phi$ outer diameter and a thickness of 4.5 mm.

The vortex gasket was mounted by means of three bolts, to a flange, located between an exhaust manifold and an exhaust pipe of the automotive internal combustion engine of Example 1, with a clamping torque of 250 kg-cm, and was subjected to durability testing on a bench at 6000 rpm for 20 hours.

The vortex gasket showed no sign of combustion gas leakage. After the test, the gasket was removed from the flange. The gasket also showed no sign of any unusual appearance.

Compared to the prior art method for manufacturing a vortex gasket by preparing a hoop and a filler in separate steps and forming them into a composite sheeting in a later step following by winding, the inventive method has a great economical advantage since an inexpensive but stable vortex gasket can be manufactured by means of an energy-saving, highly efficient, and continuous operation.

As mentioned above, the vortex gasket of the present invention shows not only good strength, flexibility and compressive resiliency, but also greatly improved sealing characteristics, even under a low clamping pressure, due to the high denseness of the filler. Thus, the vortex gasket can be advantageously used as a low-pressure gasket.

According to the present invention, previously troublesome operations can be converted into a simple, continuous operation with an increase in the mass-production rate, and inexpensive vermiculite can be used as a starting material. Thus, the present invention is very preferable in view of economic considerations.

According to the present invention, various vortex gaskets of branched, profiled, and double-ring types can be prepared, in addition to the gasket of the basic (doughnut) type.

The present invention is of course, in no way restricted to the specific disclosure of the specification and drawings, but also encompasses any modifications within the scope of the appended claims.

What we claim is:

1. A gasket comprising: a sheet having a composition of 40 to 80% by weight of thin flakes of expanded vermiculite, 1 to 30% by weight of fibers, 5 to 40% by weight of fine filling grains, and appropriate amounts of a binding agent and a vulcanizing agent; and a metal plate laminated to said sheet.

2. A gasket as recited in claim 1, in which said metal plate is provided with a plurality of projections.

3. A gasket as recited in claim 1, in which the amount of said fine grains ranges from 19 to 30% by weight.

4. A gasket as recited in claim 1, in which said fibers comprise at least one of the group consisting of pulp, stainless steel fibers, glass fibers, and ceramic fibers.

5. A gasket as recited in claim 1, in which said thin flakes of vermiculite have a diameter of 10 to 60 meshes.

6. A gasket as recited in claim 1, in which said thin flakes of vermiculite have a thickness of no more than 100 microns.

* * * * *